United States Patent [19]
Ouellette

[11] Patent Number: 5,907,412
[45] Date of Patent: May 25, 1999

[54] SCANNER/PLOTTER AND ROTATABLE DRUM FOR USE THEREIN

[75] Inventor: Alfred R. Ouellette, Saugus, Mass.

[73] Assignee: Optronics International Corporation, Chelmsford, Mass.

[21] Appl. No.: 08/573,116

[22] Filed: Dec. 15, 1995

Related U.S. Application Data

[62] Division of application No. 07/952,458, Sep. 29, 1992, Pat. No. 5,526,142.

[51] Int. Cl.[6] ...................................................... H04N 1/04
[52] U.S. Cl. ............................................ 358/491; 358/493
[58] Field of Search ..................................... 358/490, 491, 358/492, 493, 494, 495, 496, 497, 498

[56] References Cited

U.S. PATENT DOCUMENTS

| | | | |
|---|---|---|---|
| 3,925,607 | 12/1975 | Hauber | 178/7.1 |
| 3,938,191 | 2/1976 | Jarmy | 346/108 |
| 4,345,277 | 8/1982 | Ishikawa . | |
| 4,517,575 | 5/1985 | Kakimoto et al. | 358/489 |
| 4,654,526 | 3/1987 | Nakaji | 358/285 |
| 4,667,253 | 5/1987 | Chen . | |
| 4,749,296 | 6/1988 | Bohmer | 400/659 |
| 4,827,129 | 5/1989 | Tressl et al. . | |
| 4,870,504 | 9/1989 | Ishida et al. | 346/138 |
| 5,149,082 | 9/1992 | Morita . | |
| 5,317,424 | 5/1994 | Aotami | 358/491 |

FOREIGN PATENT DOCUMENTS

| | | |
|---|---|---|
| 0 193 962 | 9/1986 | European Pat. Off. . |
| 0193962 | 9/1986 | European Pat. Off. . |
| 0 483 827 | 5/1992 | European Pat. Off. . |
| 0483827 | 5/1992 | European Pat. Off. . |
| 2627428 | 8/1989 | France . |

OTHER PUBLICATIONS

IBM Technical Disclosure Bulletin, vol. 23, No. 1, Jun., 1980, p. 17.

Patent Abstracts of Japan, vol. 15, No. 113, Mar. 18, 1991.

Primary Examiner—Thomas D. Lee
Attorney, Agent, or Firm—Bromberg & Sunstein LLP

[57] ABSTRACT

A rotatable image-mounting drum for use in a scanner or plotter. The drum has an end for permitting the releasable attachment of the drum to the scanner's or plotter's supporting and turning means. The drum's image-mounting surface and the drum's attachment end are preferably made of the same material, preferably acrylic. The attachment end of the drum includes a disk at the end of the drum, which has an opening or openings passing from its outer face to its inner face. The other end of the drum preferably is not attached directly to the rest of the scanner. The plotter's or scanner's mechanism for releasably attaching the rotatable drum includes a drum mount rotatable by a motor. A clasp stem, passing through a drum-mount opening, has a clasp finger rigidly attached thereto. A cam surface, having a varying elevation, can be rotated so as to push the cam stem through the drum-mount opening. A spring urges the stem against the cam surface. As the cam surface is rotated with respect to the drum mount, the distance between the finger and the drum mount's exterior side varies. The finger can pass through the opening in the attachment end of the drum, and the drum may be clasped between the finger and the drum mount's exterior side.

16 Claims, 10 Drawing Sheets

SCANNER/PLOTTER AND ROTATABLE DRUM FOR USE THEREIN

RELATED U.S. APPLICATIONS

This application is a divisional of U.S. application Ser. No. 07/952,458, filed Sep. 29, 1992, now U.S. Pat. No. 5,526,142, which is hereby incoporated herein by reference.

TECHNICAL FIELD

This invention generally relates to scanners for deriving tone value information from an image original and to plotters that use tone-value information to plot a reproduction, and in particular to scanners and plotters that use a rotatable drum mounted on only one of its ends.

BACKGROUND ART

Scanners and plotters having rotatable drums are well known in the prior art. Some scanners are designed to permit the removal of the rotatable drum. Many such removable drums are mounted at two ends, which makes the removal or attachment of the drum by one person awkward. Scanning drums that are mounted at only one end do exist in the prior art, but typically have a shaft extending from the mounted end. Because of the length of the shaft, such scanning drums are still awkward to mount.

In addition, rotatable scanning and plotting drums of the prior art are typically made of several pieces, each made of a different material. Typically the body of the drum is made of acrylic plastic while one or both ends of the drum are made of metal or include metal rings. The use of different materials, having different thermal expansion coefficients can cause distortion of the drum when its temperature rises--even slightly. In addition, mechanically fastening the plastic and metal drum parts together is fairly expensive.

DISCLOSURE OF INVENTION

The invention may be used in a scanner, which scans an image original and converts the tone value information of the original into electrical signals, or it may be used in a plotter, which converts electrical signals representing tone values into an image to be plotted on film or another medium. A scanner may scan transparencies or opaque prints and documents containing the image original. For convenience, plotters and scanners are herein collectively referred to as "image-information converters," since both involve the conversion of electrical signals representing tone values to or from visual images. Also for convenience, the various media that a scanner scans (e.g., transparencies, prints or documents) or that a plotter records on (e.g. film, paper or metal printing plates) are herein collectively referred to as "substrates."

The invention includes a rotatable drum for use in an image-information converter having a mechanism for supporting and turning the drum about an axis. The drum has a substrate-mounting surface curved so that every point on the surface is equidistant from the axis, and an end of the drum adapted for permitting the releasable attachment of the drum to the scanner's or plotter's supporting and turning means. The drum's substrate-mounting surface and the drum's attachment end are preferably made of the same material, preferably acrylic.

The attachment end of the drum includes a disk at the end of the drum. The disk preferably has an opening or openings passing from its outer face to its inner face. The attachment end permits the releasable attachment of the drum to the image-information converter by a mounting mechanism. The other end of the drum preferably is not attached directly to the rest of the scanner.

The image-information converter's mounting mechanism for releasably attaching the rotatable drum includes a drum mount attached to and rotatable by a motor. In a preferred embodiment, a clasp stem, passing through a drum-mount opening, has a clasp finger rigidly attached thereto. A cam surface, having a varying elevation, can be rotated so as to push the cam stem through the drum-mount opening. A spring urges the stem against the cam surface. As the cam surface is rotated with respect to the drum mount, the distance between the finger and the drum mount's exterior side varies. The finger can pass through the opening in the attachment end of the drum, and the drum may be clasped between the finger and the drum mount's exterior side.

DESCRIPTION OF SPECIFIC EMBODIMENTS

Figure 1:
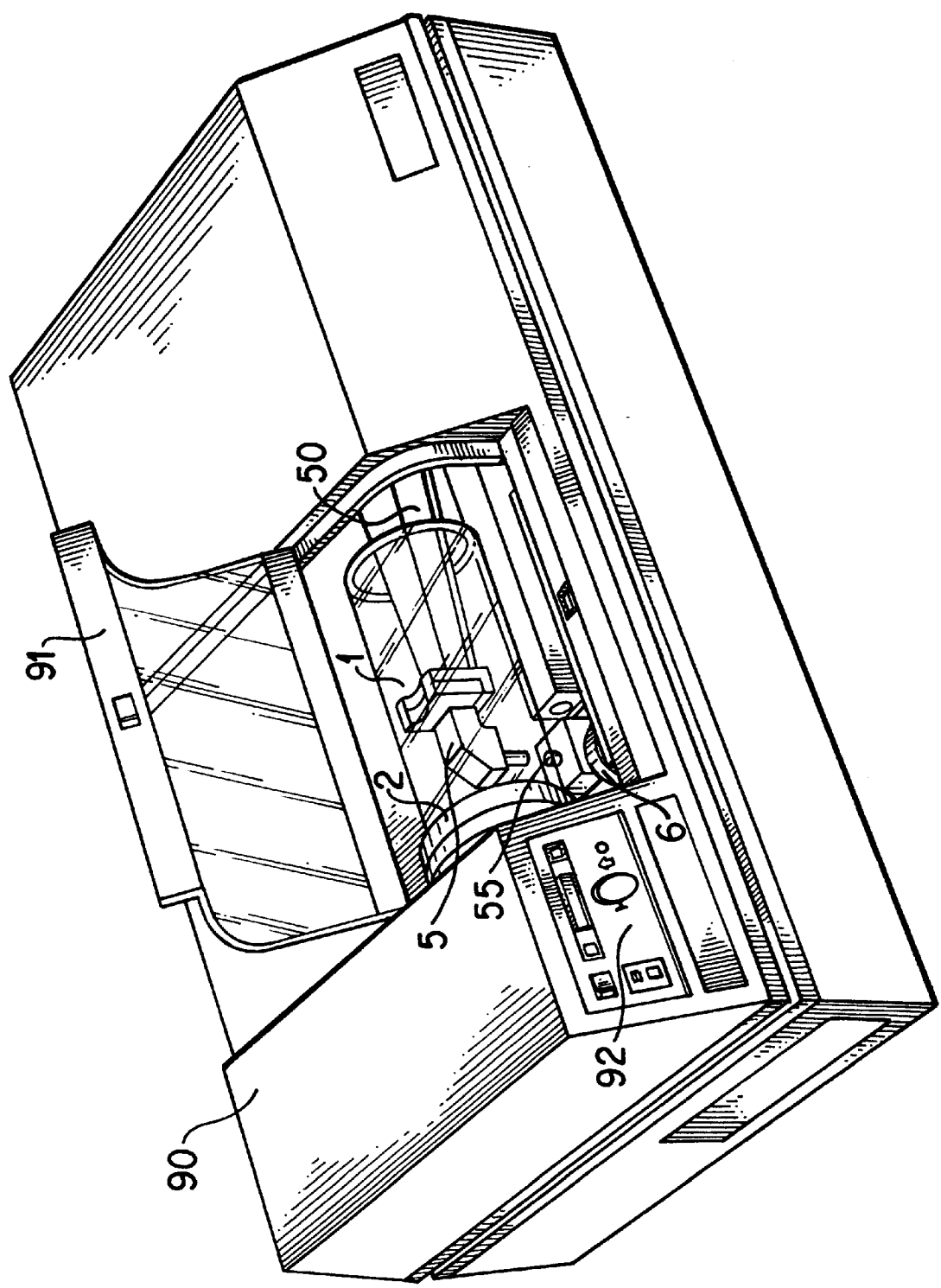
FIG. 1 shows a perspective view of a scanner, including the drum and the scanner's enclosure or electronics.

FIG. 1 shows the scanner, including the enclosure 90, which covers the mechanical and electronic components of the scanner. The electronics, which are not shown, control the scanner and record the tone-value information gathered by the scanner, by means well known in the art. A control panel 92 provides some basic control of a scanner, but typically a separate workstation connected to the scanner by a cable is also used. The scanner shown in FIG. 1 uses a removable, rotatable drum 1 made of a transparent material where the image original is mounted. During scanning, a beam from a light source 5, mounted on an arm 50 inside the drum, passes through the transparent drum 1 and the image original to a light detector 55, which measures the tone value or values of the scanned image at the point through which the beam passes. Access to the drum 1 is provided by a hinged drum cover 91. To permit removal of the drum 1 from the drum mount 2, the light source 5 and its arm 50 are retracted, i.e. moved to the right.

Figure 2:
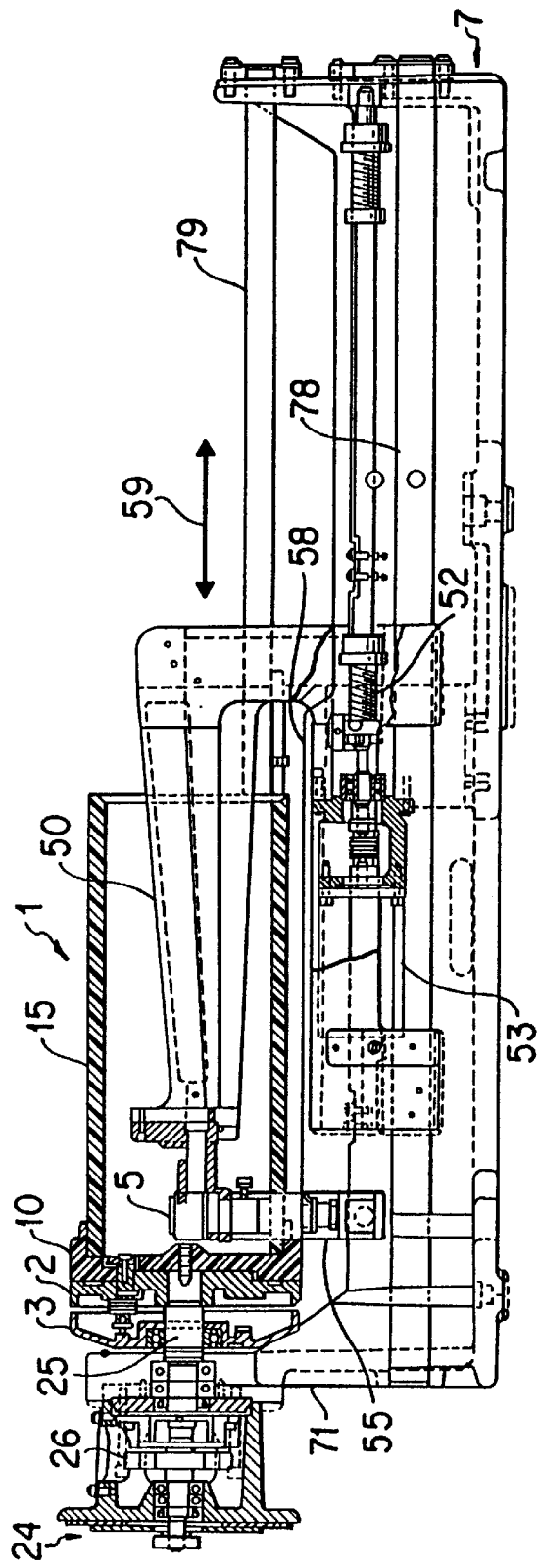
FIG. 2 shows a partially cut-away front elevational view of the inner mechanical components of the scanner shown in FIG. 1.
Figure 3:
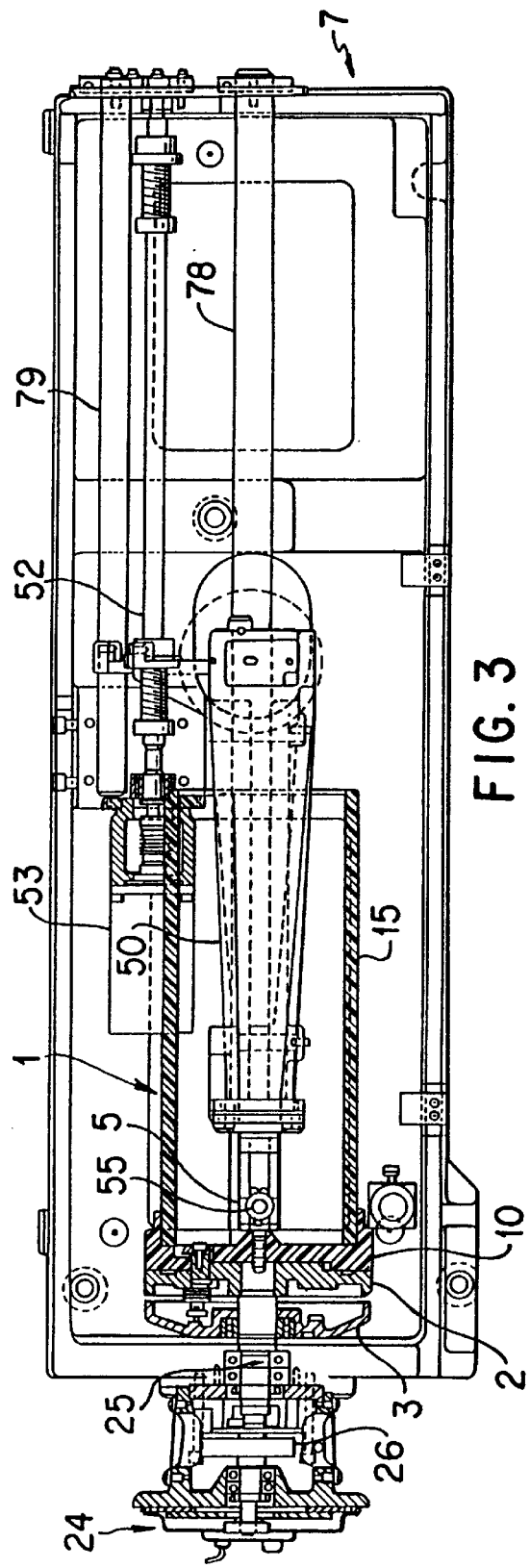
FIG. 3 shows a partially cut-away top plan view of the mechanical components of the scanner shown in FIG. 2.

FIGS. 2 and 3 respectively show front and top views of the inner mechanical components of the scanner. The mounting end 10 of the drum 1 is releasably attached to the drum mount 2, which is rotated by a pancake motor 24. When the drum 1 is attached to the drum mount 2, the drum 1 rotates with the drum mount 2. The motor 24, the drum mount 2 and the shaft 25 connecting the two are supported by frame member 71, which is located at one end of the frame 7. The drum mount 2 and the shaft 25 are rotatable with respect to the frame 7 and the frame member 71.

Guide bars 78 and 79 are mounted between a second frame member 72, located at the other end of the frame 7, and a guide bar mount (not shown), which is attached to and located in the middle of the frame 7. Slidably mounted on the guide bars 78 and 79, is the optics carriage 58 including the light source arm 50, which holds the light source 5. When the drum 1 is mounted onto the drum mount 2, the arm 50 extends into the interior of the drum 1, and as noted above the light source 5 directs the beam through the transparent image-mounting portion 15 of the drum 1 to the light detector 55, which is also mounted on the optics carriage 58. In the preferred embodiment being discussed here, the light source 5 is a xenon bulb providing white light.

The optics carriage 58, including the light source 5 and the light detector 55, is moved along the frame 7 in the direction of arrows 59, by means of a lead screw 52, which is turned by a stepper motor 53. By recording the number of steps taken by stepper motor 53 (and thereby the number of rotations of the lead screw 52), the position of the light source 5 and the light detector 55 along the axis of the drum 1 can be tracked. An encoder 26 measures the rotation of the drum 1 caused by motor 24, so as to determine the position of the light source 5 and light detector 55 along the circumference of the drum 1. Information regarding the drum's angular position (from encoder 26) and the axial position of the optics carriage 58 (from stepper motor 53) to an electronic processor (not shown). The processor also receives tone-value information from the light detector 55 and matches the tone value information received from the light detector 55 with the position information received from the encoder 26 and stepper motor 53.

Figure 4:
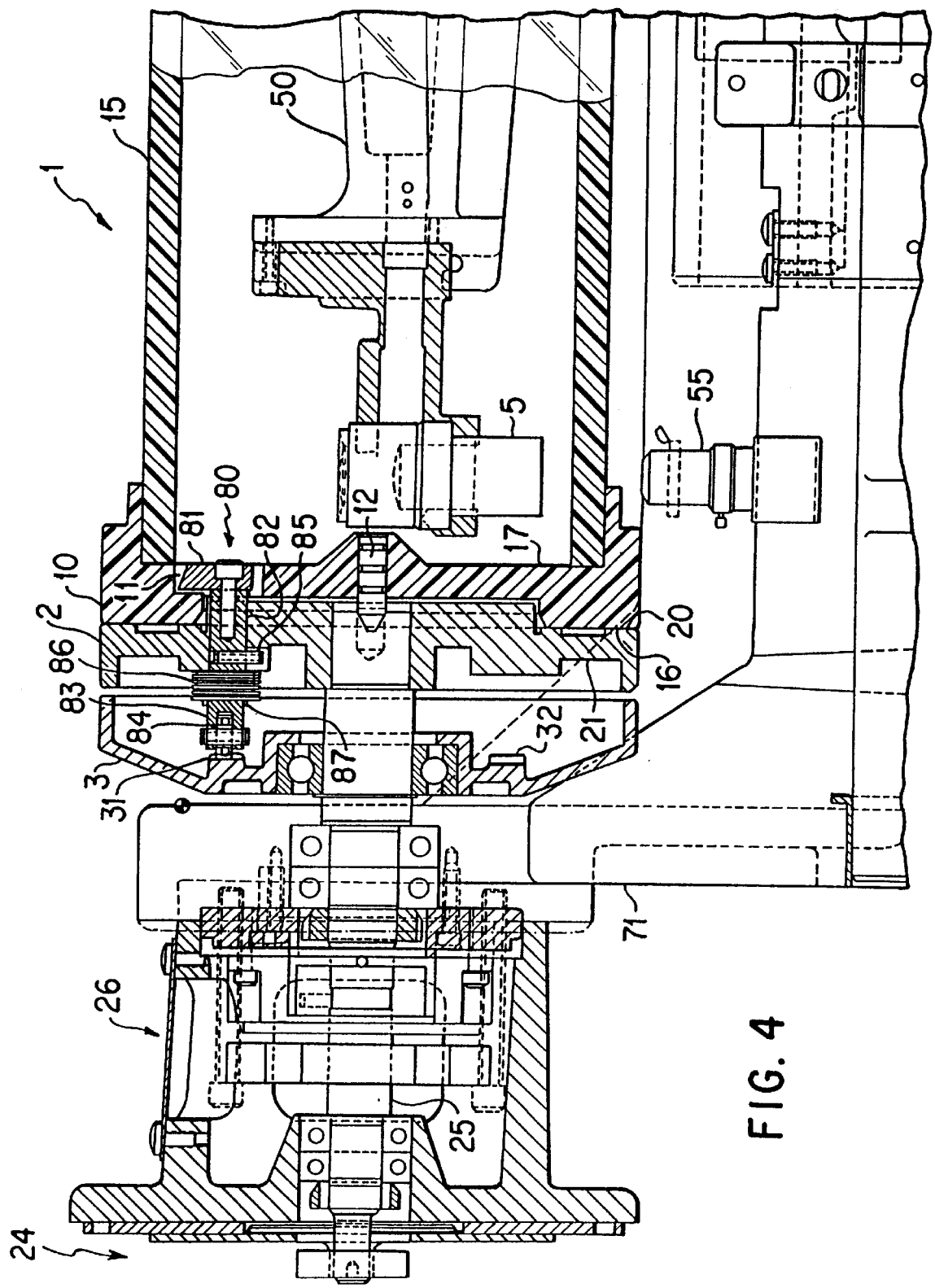
FIG. 4 shows the motor and drum-mounting mechanism shown in FIG. 2 in greater detail.

FIG. 4 shows a cut-away side view of the drum attachment and rotation systems, including the drum mount 2, the cam cup 3, the shaft 25, the motor 24 and the encoder 26. (The shaft 25 is ball bearing supported with an axially fixed, preloaded duplex set of main bearings and an axially floating, preloaded duplex set of tail bearings. Axial loading avoids tight tolerances and permits differential expansion of the members.) The cam cup 3 is rotatable with respect to the drum mount 2. A user of the scanner, who is mounting the drum 1 on the drum mount 2, can easily effect the rotation of the cam cup 3 with respect to the drum mount 2. The relative rotation of the cam cup 3 and the drum mount 2 axially actuates the clasp fingers 81, i.e., causes the clasp fingers 81 (only one of which is shown in FIG. 4) away from the exterior face 20 of the drum mount 2. The clasps 80 have stems 82, which extend through openings in the drum mount face 20. The end 83 of the clasp stem 82 furthest from the clasp finger 81 is adapted to receive a wheel 84. In the interior of the cam cup 3, a circular cam surface 31 is located so that—when there is no drum being held by the clasps—each of the three clasp stem wheels 84 rests on the surface 31, no matter how the cam cup 3 is rotated with respect to the drum mount 2. The cam surface 31 is not level and has areas 32 where the wheel 84 is forced closer to the drum mount 2. (See discussion below.) A short radial dowel 85 keeps the clasp 80 properly oriented, so that the clasp's wheel 24 is aligned with cam surface 31 (and tangentially with the rotation of the cam cup 3) to ensure that the cam cup 3 can be easily rotated, and so that clasp finger 81 remains aligned with the openings 11 of the drum's mounting end to ensure that the drum can be easily mounted.

A spring 86 is placed around the clasp stem 82 and next to the interior face 21 of the drum mount 2. The spring 86 may be formed with several washers such as Belleville-type spring washers, and preferably the spring 86 exerts a substantially constant force over its operating stroke. In the drum mount 2 shown in FIG. 4, the spring 86 rests against the interior face 21 of the drum mount 2. The other end of the spring 86 rests against a widened portion 87 of the stem 82. The spring 86 forces the clasp stem wheel 84 away from the drum mount's interior face 21 and against the cam surface 31, and thereby also forces the clasp finger 81 towards the drum mount's exterior face 20.

Figure 11:
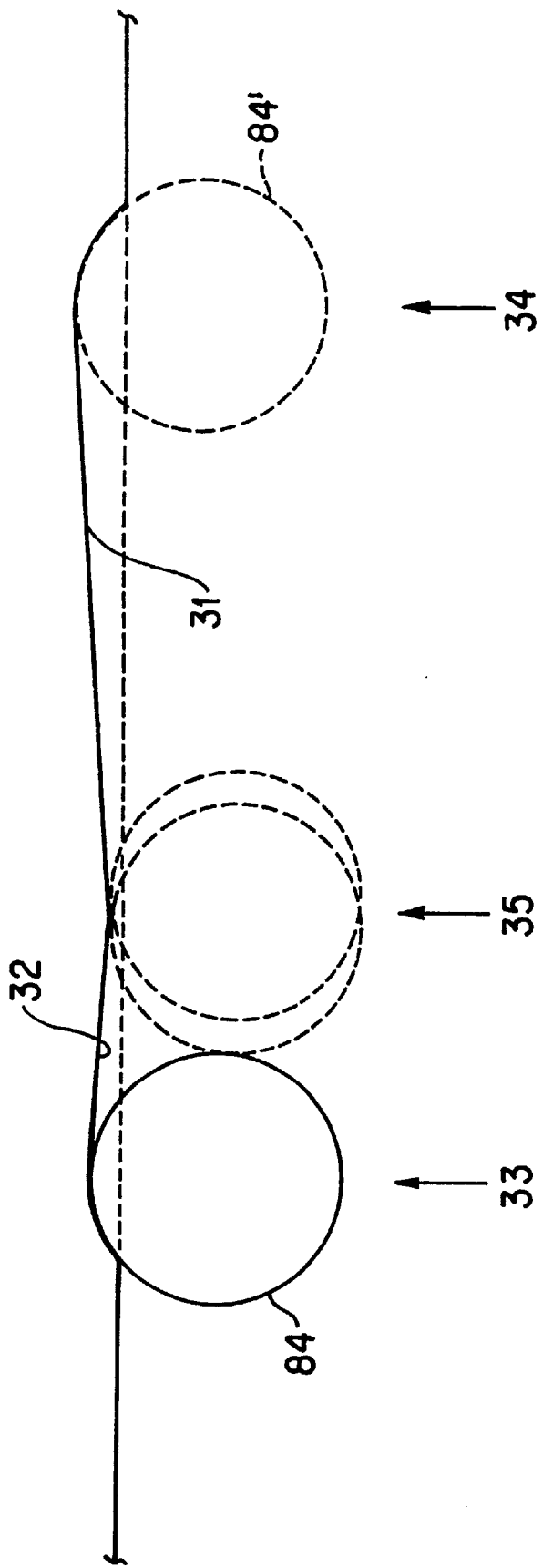
FIG. 11 shows schematically the various positions of the clasp wheel on the cam surface.

The cam surface 31 has three separate elevated areas 32, corresponding to each of the clasps 80. FIG. 11 shows how each of the three zones of the cam surface 31, including the more elevated areas 32 of the cam surface, forces each clasp stem 82 in the direction of the drum 1, and thereby causes the clasp fingers 81 away from the exterior face 20 of the drum mount 2. (The cam surface 31 of course forms a ring centered around the axis of the shaft 25, but is shown straightened out for purposes of clarity in FIG. 11.) As the cam cup 3 is turned (about the axis of rotation of the drum and the shaft 25) with respect to the drum mount 2, the elevated area 32 is forced under the wheel 84 (position 33 in FIG. 11) causing the clasp stem in the direction of the drum. Like the three clasps 80, the three elevated areas 32 are located 120° apart, so that all the clasp fingers 81, which are likewise located 120° apart, are pushed away from the exterior drum mount face 20 at the same time.

When the drum 1 is properly seated on the drum mount 2, it may be locked into position by rotating the cam cup 3 with respect to the drum mount 2 so that the clasp wheel 84' is moved over a small hump 35 into position 34. In position 34 the wheel 84' is allowed to move away from the drum. (The spring 86 always tends to force the wheel away from the drum.) The movement of the wheel 84' away from the drum causes the clasp finger 81 to move towards the exterior face 20 of the drum mount. Thus, a portion of the drum's mounting end 10 can be held between the clasp finger 81 and the drum mount's exterior face 20. When the drum 1 is being so held, the thickness of that portion of the drum 1 being held by the fingers 81 prevents the wheel 84' from touching the cam surface 31, thereby equalizing the force generated by each of the three clasps 80.

The seating of the drum (discussed below) requires that the clasp fingers 81 be pushed away from the drum mount 2. The cam surface 31 is shaped with a hump 35 so that the wheels 84 do not roll from position 33 to position 34 while the drum is being seated. Thus, because of the hump 35, the clasp fingers 81 remain extended away from the drum mount 2 without the user having to hold the cam cup 3 and the drum mount 2 while the drum is being loaded.

FIGS. 7–10 show several views of the drum 1. The drum has a image-mounting surface 15, which in this embodiment is made of a transparent acrylic plastic. The image-mounting surface 15 is made using a tank-immersed rotational molding method that is well known in the art. The mold is a closed-end cylinder into which a pre-measured volume of a resin/catalyst liquid is filter injected. The mold cylinder is placed into a temperature-controlled hot water bath and rotated slowly about its central axis. The wall of the acrylic drum increases in thickness with each revolution by a surface deposition method until the desired wall thickness is obtained. After being molded the image-mounting portion may be machined in order to insure that every point on its outer surface is precisely equidistant from the drum's central axis, the axis of rotation.

The drum's mounting end 10 does not need to be of optical quality—indeed it need not be transparent; nevertheless, it is preferable that the mounting end 10 be made of the same material as the image-mounting portion 15, so as to eliminate any difference in thermal expansion coefficients between the two parts of the drum 1. As noted above, differences in the thermal expansion coefficients usually lead to distortions in the drum affecting the quality of the scan. The process for making the image-mounting portion 15 need not be used to make the mounting end 10; instead, a simpler, less expensive molding process may be used. The mounting end 10 does need to made within fine enough tolerances to ensure that the image-mounting portion 15 does not have a wobble when it is being spun. The image-mounting portion 15 and the mounting end 10 are preferably solvent bonded together, which is much simpler and more inexpensive to do than the mechanical fastening done in manufacturing prior-art drums. In an alternative embodiment, the two portions of the drum are bonded together with adhesive. In another alternative embodiment, the two portions of the drum are formed together during the molding; thus formed, the drum is a seamless piece of material.

Figure 6:
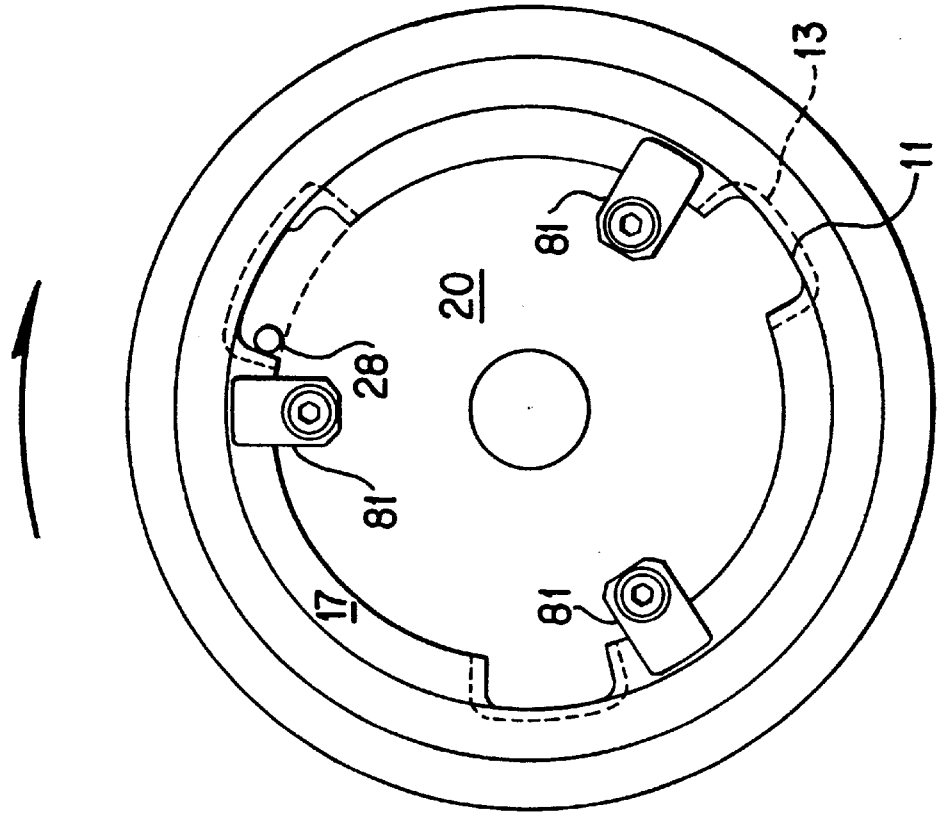
FIGS. 5 and 6 show the steps of mounting a drum from the right-side (open-ended side) of the drum.
Figure 5:
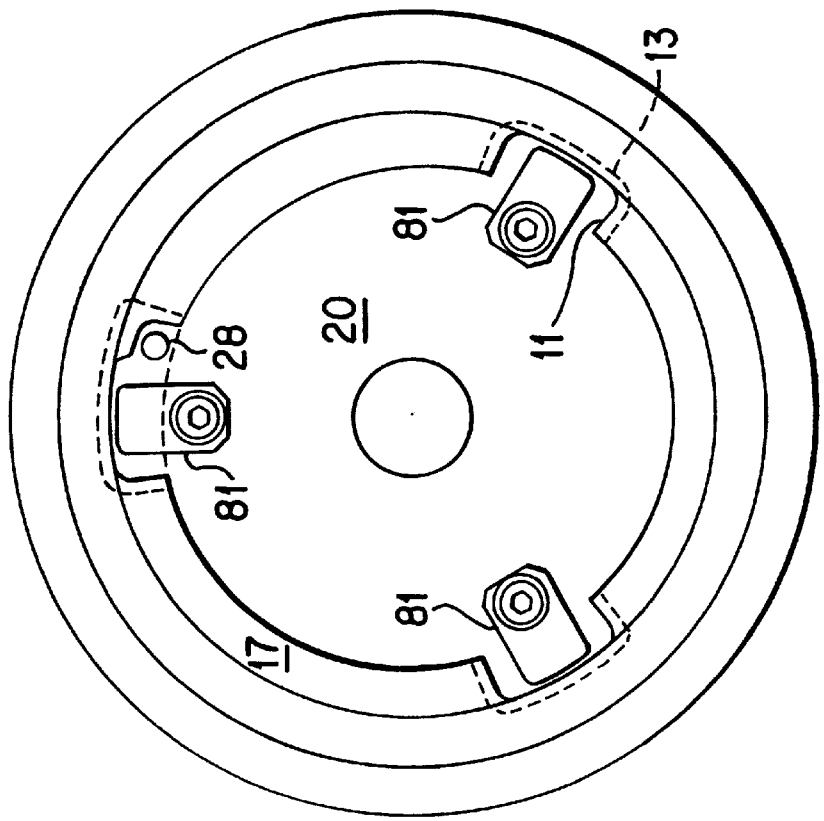
Figure 7:
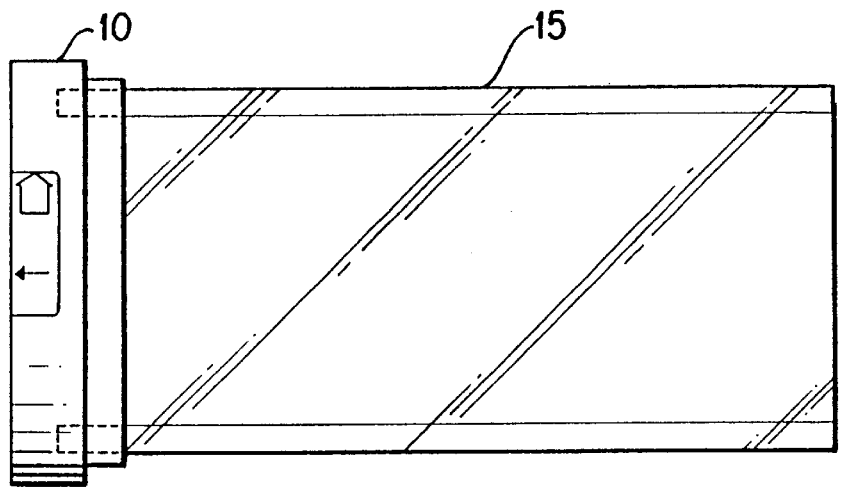
FIG. 7 shows a side view of a drum.
Figure 8:
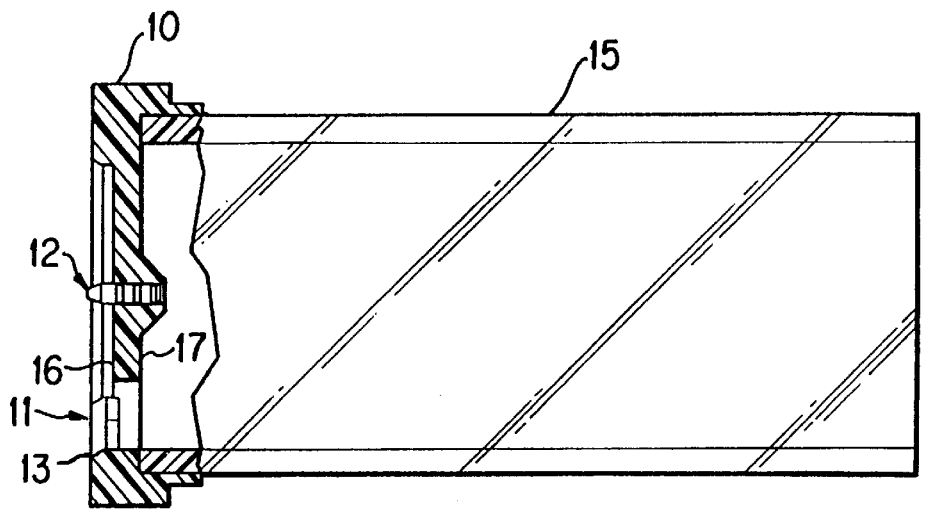
FIG. 8 shows a partially cut-away view of the drum of FIG. 7.

It is also preferred that the exterior face 20 of the drum mount 2 and the outer face 16 of the disk forming the drum's mounting end 10 be shaped so as to permit radial slippage between the drum 1 and the drum mount 2, which are made of different materials—plastic and metal—and therefore have different thermal expansion coefficients. (See FIG. 4 for the shape of the drum mount's exterior face 20.) The orientation of the clasp fingers 81 with respect to the clasp stems (radially outward away from the axis of rotation, as shown in FIGS. 5 and 6) also permits radial slippage of the drum when it expands more than the drum mount 2. A small metal dowel 12 is mounted in the center of the drum's mounting end 10 in order to aid in centering the drum 1 during mounting. Because of the small size of the dowel 12, the different thermal expansion coefficients of the dowel 12 and the rest of the drum 1 do not pose a problem.

Figure 9:
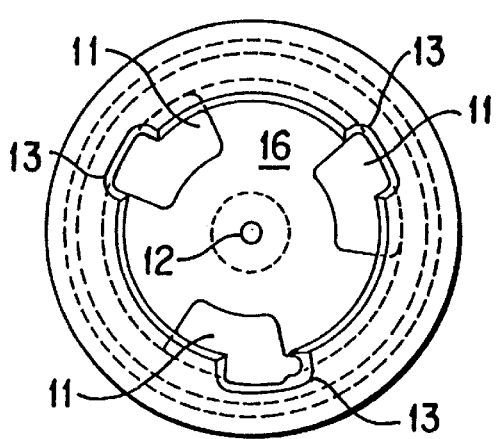
FIG. 9 shows a left-side (the drum mounting end) view of the drum of FIG. 7.
Figure 10:
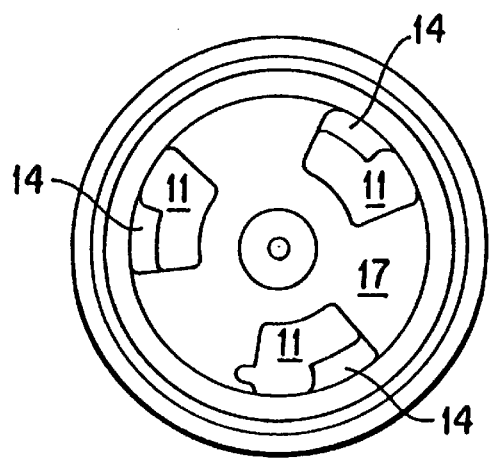
FIG. 10 shows a right-side (open-end side) view of the drum of FIG. 7.

As can be seen in FIGS. 9 and 10, the drum's mounting end 10 has three openings 11, which permit the entry of the clasps 80. These openings 11 are tapered at the outer face side 16 of the disk that forms the mounting end 10. This tapering 13 eases the lining up of the clasp fingers 81 and the openings 11 while the drum 1 is being placed on the drum mount 2. The cross-hatched areas 14 shown in FIG. 10 are the areas on the inner face 17 of the drum 1 where the clasp fingers 81 clasp the drum.

FIGS. 5 and 6 show a drum 1 of a somewhat different design being mounted on the exterior face 20 of the drum mount 2. (In this drum design a single large opening 11 is used, instead of the three smaller openings 11 in the design shown in FIGS. 7–10. The design having a single large opening cannot of course use the small dowel 12 to help center the drum, since it has no material at the axis of rotation for mounting the dowel.) In FIG. 5 the drum 1 is placed against the drum mount face 20 so that the clasp fingers 81 protrude through the opening 11 (or openings). The drum is then rotated with respect to the drum mount face 20 until the stop pin 28 prevents further rotation, as shown in FIG. 6. As can be seen in FIGS. 5–10, an opening 11 (or the opening) is widened at one point in order to accommodate the stop pin 28 when the drum is being loaded as shown in FIG. 5. At this point the cam cup 3 is rotated to pull the clasp fingers 81 against the inner face 17 of the drum.

Figure 12C:
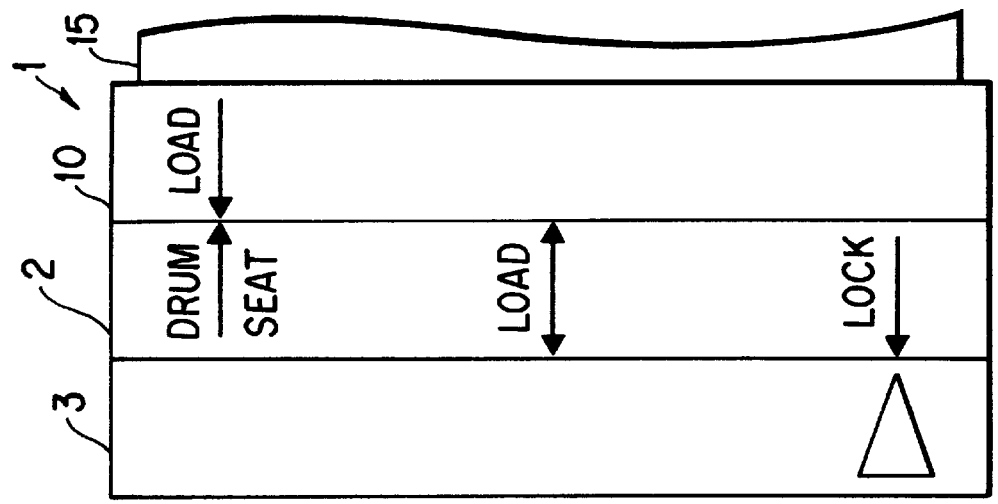
FIGS. 12A, 12B and 12C shows the relative positions of the cam cup, the drum mount and the drum's mounting-end during seating and locking.
Figure 12B:
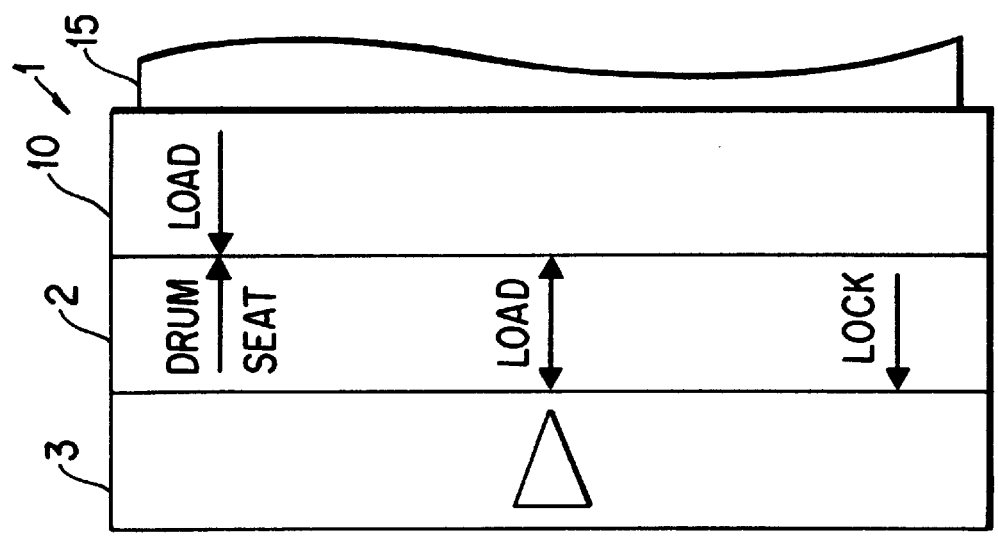
Figure 12A:
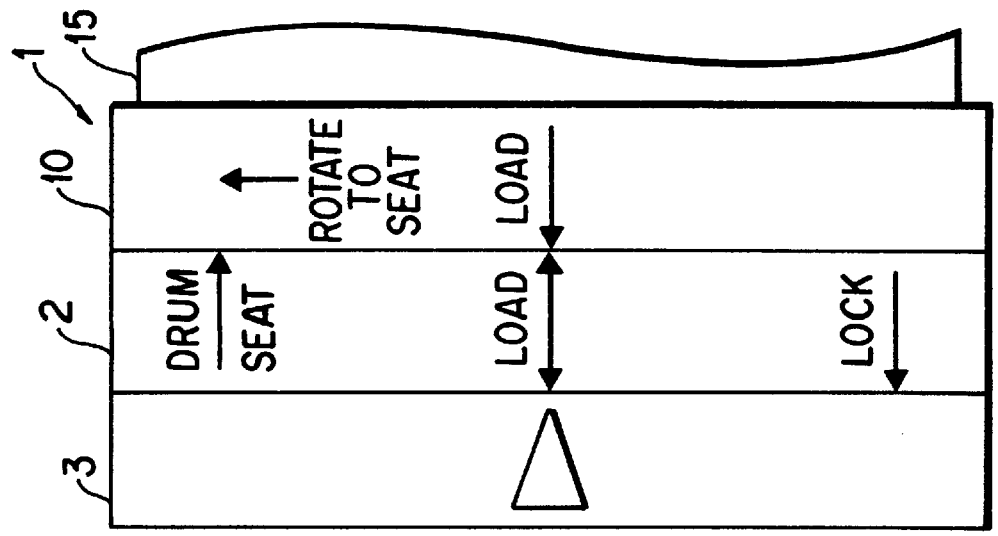

The mounting mechanism of the present invention provides a process to mount and dismount the drum that is exceptionally easy for a single person to perform. FIGS. 12A–12C show a top view of the cam cup 3, the drum mount 2 and the drum's mounting end 10 during the seating and locking process. To assist in the seating and locking process, the cam cup 3, the drum mount 2 and the drum's mounting end 10 have markings inscribed thereon as shown in FIGS. 12A–12C.

For placing the drum 1 against the drum mount 2, the arrow on the cam cup 3 should be lined up with the double-headed "LOAD" arrow on the drum mount 2 as shown in FIG. 12A; this alignment places the cam wheels 84 in position 33 in FIG. 11 causing the clasp fingers 81 to be pushed away from the drum mount's exterior face 20. (As noted above, the shape of the cam surface 31 shown in FIG. 11, in particular the cam surface's hump 35, maintains the clasp fingers 81 in a position spaced away from the drum mount's exterior face 20 during loading without the user having to hold both the cam cup 3 and the drum mount 2.) The drum's mounting end 10 can then be placed against the drum mount 2 with the drum's "LOAD" arrow aligned with the drum mount's "LOAD" arrow, so that the clasp fingers 81 can pass through the drum's openings 11, as shown in FIG. 5. When placing the drum 1 against the drum mount 2, the user can at first use both hands to hold the drum 1; when seating and locking the drum 1, the user can hold the drum 1 in the right hand, while using the left hand to hold the drum mount 2 or to turn the cam cup 3.

The next step, seating the drum 1, is shown in FIGS. 6 and 12B: the drum is rotated with respect to the drum mount 2 in the direction of the arrow inscribed on the drum's mounting end and labeled "ROTATE TO SEAT" until stopped by pin 28, at which point the drum's "LOAD" arrow is lined up with the drum mount's "DRUM SEAT" arrow. In this seated position the clasp fingers 81 extend over areas 14 of the disk 17 forming the drum's mounting end 10.

The next step, locking the drum in place, is shown in FIG. 12C: the cam cup 3 is rotated with respect to the drum mount 2 so that the arrow inscribed on the cam cup 3 is lined up with the arrow labeled "LOCK" inscribed on the drum mount 2. This alignment places the cam wheels 84 in position 34 in FIG. 11, causing the clasp fingers 81 to be pulled towards the drum's inner face 17 and to thereby hold the drum 1 in place. (As noted above when the drum is locked in place, the cam wheels 84 do not touch the cam surface 31.)

To unload the drum 1, the foregoing steps are performed in reverse. The drum 1 is held with the user's right hand while the left hand rotates the cam cup 3 from the "LOCK" position to the "LOAD" position. This action moves the clasp fingers 81 away from the gripped areas 14 on the drum's inner face 17, thereby unlocking the drum 1. Then the user's left hand is moved to the drum mount 2 in order to hold the drum mount 2 in place, while the right hand is used to rotate the drum 1 from the "DRUM SEAT" position to the "LOAD" position. At this point the drum 1 can be pulled away from the drum mount 2.

During the mounting and dismounting steps outlined above, the right hand of the user is normally holding the free end of the drum, in order to keep the drum's mounting end 10 against the drum mount's exterior face 20. Of course, to rotate the cam cup 3 with respect to the drum mount 2, either the cam cup 3 or the drum mount 2, or both may be rotated. During mounting, once the drum has been seated, the stop pin 28 allows the drum mount 2 to be rotated (or kept in place) by rotating (or holding in place) the drum 1 to effect locking of the drum 1. Likewise to unlock the drum 1 during dismounting, the cam cup 3 can be rotated with respect to the drum mount 2 by holding the drum 1 and rotating the cam cup 3 or vice versa, or by rotating both the drum 1 and the cam cup 3 in opposite directions. Similarly, the drum 1 may be rotated with respect to the drum mount 2 by turning either or both.

Instead of using the cam cup 3 and cam surface 31 to axially actuate the clasps 80 as described above, other means, such as stepper motors, may be used to move the clasp fingers 81 towards and away from the drum mount 2; and instead of turning the cam cup 3 the user in such an alternative embodiment may push a button or flip a switch to axially actuate the clasps 8.

The specific scanner shown in FIGS. 1–4 uses a drum that has a transparent image-mounting portion and which scans a transparency as the image original. In an alternative embodiment that can perform scanning of opaque prints, the scanner may have both the light source and the light detector mounted outside the drum. In such an alternative embodiment, the drum does not have to have a transparent image-mounting portion.

The removable rotatable drum shown in FIGS. 7–10 may also be used in a plotter. When used in a plotter where film is mounted on the outer surface of the drum and is exposed by a light beam coming from a source located outside of the drum, the drum's substrate mounting portion does not have to be transparent.

Figure 13:
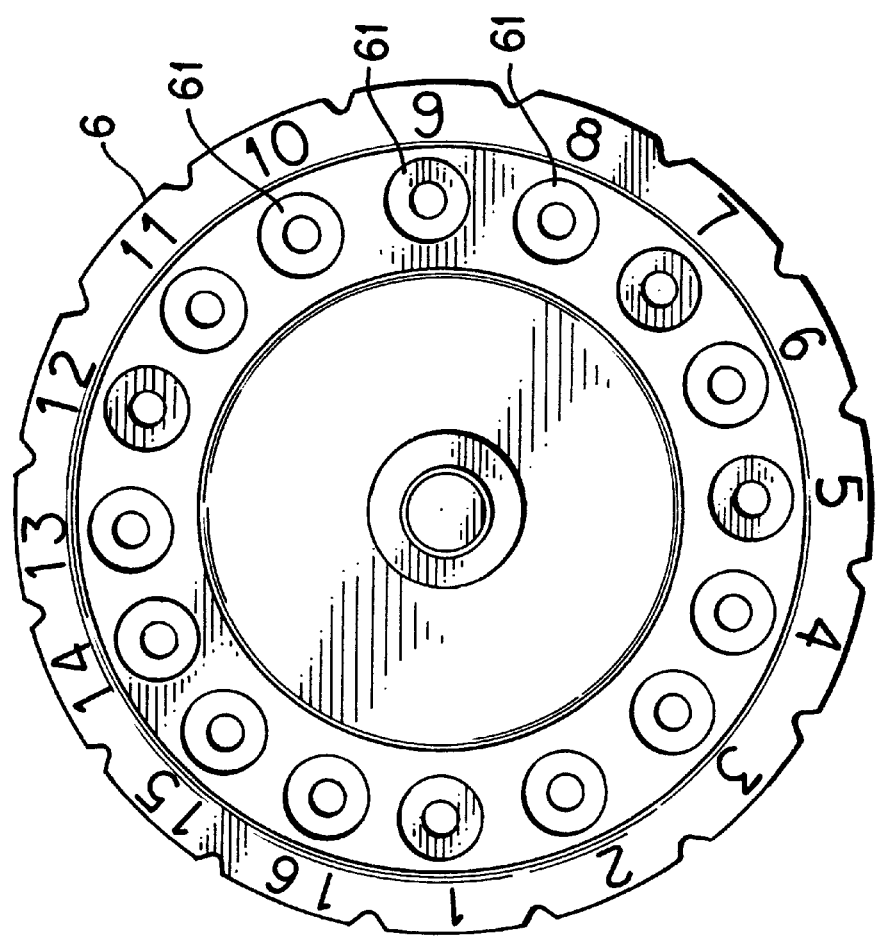
FIG. 13 shows a front view of the aperture wheel.

The optical system of the scanner shown in FIG. 1 has an aperture wheel 6, which is shown in FIG. 13. The numbers on the wheel inform the user which aperture is in the beam path. Aperture wheels have been used in the prior art for changing the aperture size. The aperture wheels shown in FIGS. 13–17 are skewed, so that each of the apertures is at a slightly different optical distance from image original when the aperture is rotated into position. (Optical distance refers to the distance the beam must travel, as opposed to the actual distance, which may be different because mirrors typically bend the beam.)

Figure 14:
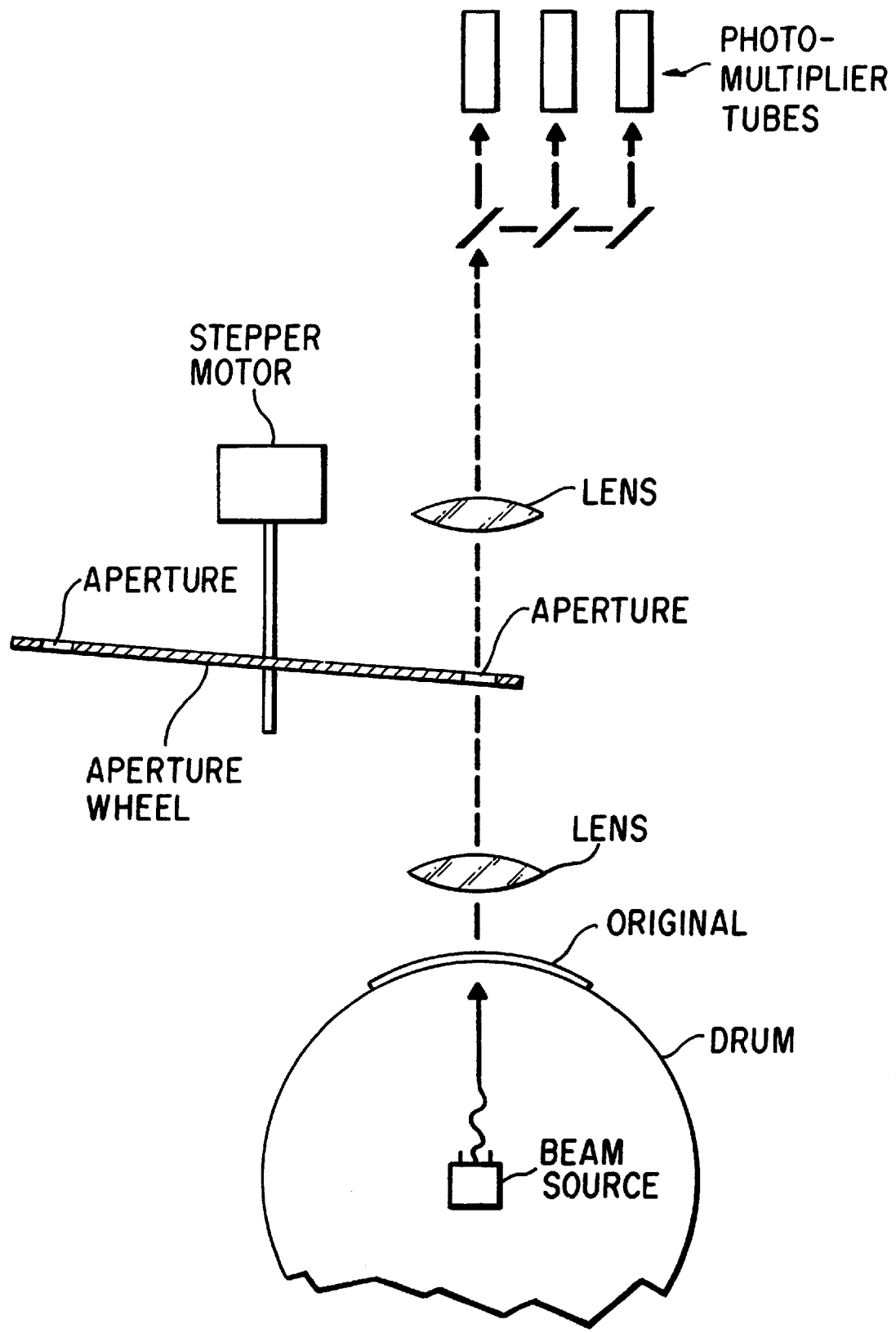
FIG. 14, which is not to scale, represents the operation of the aperture wheel in a scanner.

FIG. 14 shows where the aperture fits into the scanner's optical system. A light source (item 5 in FIGS. 1–5) sends a beam of light through the drum's image-mounting portion (item 15 in FIGS. 2–4) and the transparency mounted thereon containing the image original. The beam passes through two lenses. An aperture, which narrows the beam, is located between the lenses. The beam is split by half-silvered mirrors, and the resulting beams are received by photo-multiplier tubes (which are located in the light detector 55 of the scanner). Typically there are three such tubes, which detect the red, green and blue tone values that the beam has acquired by passing through a point of the image original.

The actual radial location of the image original on the drum-mounted transparency substrate varies; sometimes it is on the surface of the transparency substrate, sometimes it is in the middle of the substrate. In addition, the thickness of the transparency varies. As a result of the varying radial position of the original image, the image sent to the photo-multiplier tubes can be blurred, especially for very small aperture sizes, unless the position of the lenses or the aperture is adjusted. By skewing the aperture wheel as shown in FIG. 14, the apertures on the wheel are located at different positions in relation to image original.

Figure 15:
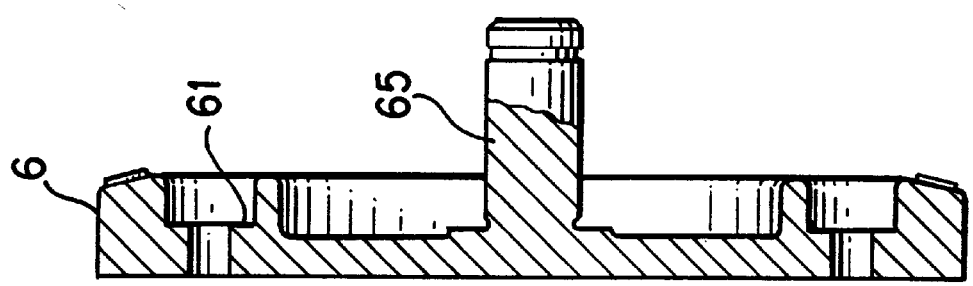
FIG. 15 shows a cross-section of the aperture wheel shown in FIG. 13.
Figure 17:
FIG. 17 shows a side view of the aperture wheel shown in FIG. 16.
Figure 16:
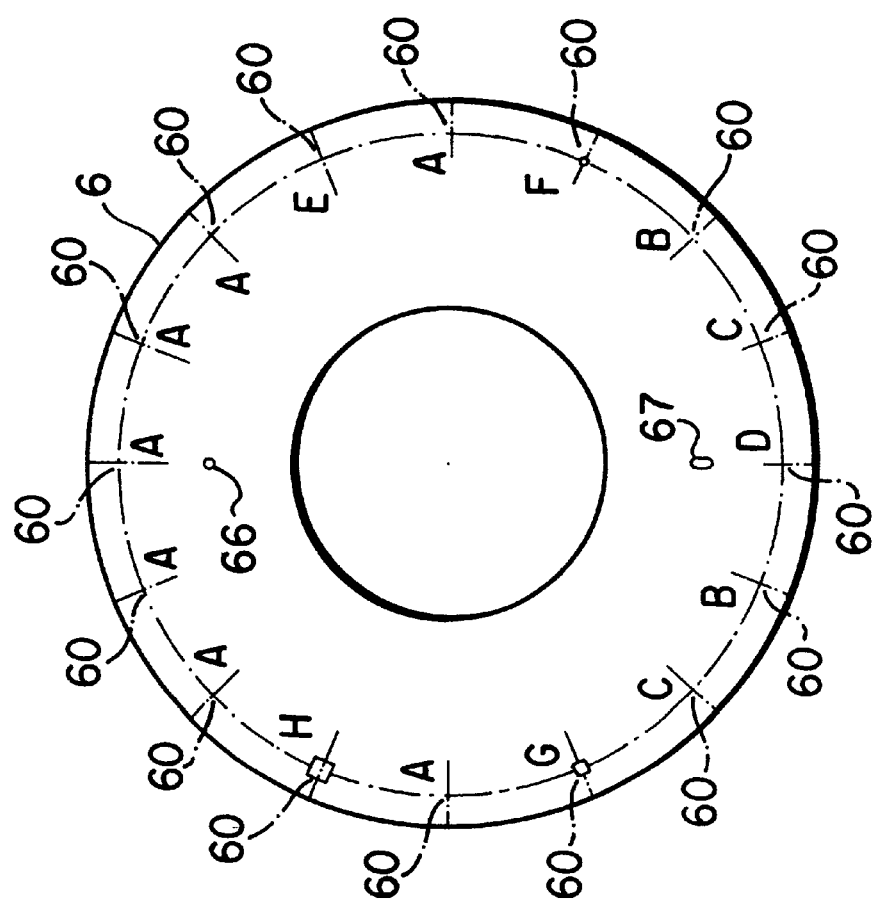
FIG. 16 shows a front view of an alternative aperture wheel.

FIG. 15 shows a cross-sectional view of the aperture wheel 6 shown in FIG. 13. In this wheel, the apertures are mounted in aperture receptacles 61. FIGS. 16 and 17 show front and side views of an alternative aperture wheel 6, wherein the apertures 60 are formed right in the wheel body itself. Two mounting/alignment holes 66 and 67 are used for mounting the wheel 6 to a shaft extending from a stepper motor that turns the aperture wheel.

The seven apertures labeled as A in FIG. 16 are the smallest, at 12 square microns each. There are two apertures each labeled B and C, which are 25 and 50 square microns respectively. The remaining apertures are all larger than the C apertures, and since they do not have the same blurring problem that the smaller apertures have, there only needs to be one each of the larger sized apertures. Aperture D is 100 square microns; aperture E, 200 square microns; aperture F, 400 square microns; aperture G, 800 square microns; and aperture H, 1600 square microns. The heel 6 is mounted so that the A apertures opposite each other on the wheel are located at the points of the wheel 6 that are the closest to and the furthest from the image original. The A apertures, the smallest apertures, have the most locations along the beam, since they are the most sensitive to changes in the radial position of the image original. Thus, the user of the scanner, in addition to being able to choose the aperture size, can—for the smaller apertures—choose various locations for the aperture along the beam; the desired location being dependent on the location of image original (which depends on the thickness of the substrate and whether the image is in the middle of the substrate or on its surface.)

Since the problem of blurring also arises in plotters that plot on films of varying thicknesses and that use light beams cropped by apertures, the skewed aperture wheel can also be used in plotters.

Alternatively, instead of adjusting the position of the aperture with respect to the substrate, the position of the lenses may be adjusted (as noted above). The position of the lenses may be adjusted by a skewed lens wheel that would function the same way as the skewed aperture wheel. Instead of having several apertures of the same size mounted at different locations on the wheel, the skewed lens wheel would have several lenses of the same type mounted at different locations on the wheel, so that rotation of the wheel varies the optical distance between substrate and the lens that is being used. For convenience, the term "optical element" refers to either a lens or an aperture.

Thus, an optical-element wheel, rotatable about an axis, can be used to minimize blurring resulting from different image original positions in an image-information converter that uses a beam from a beam source to transfer information between a substrate, mounted on a substrate-mounting surface, and an electronic processor that processes electronic signals representing tone-value information. The optical element wheel includes at least two optical elements having the same characteristics (e.g., size for an aperture or focal length for a lens) mounted on the wheel. The optical-element wheel is mounted so that it is not perpendicular to the axis, and so that as it is rotated the optical elements are interposed in the beam at different optical distances from the substrate-mounting surface.

What is claimed is:

1. A rotatable drum for use in an image-information converter having means for supporting and turning the drum about an axis, the drum comprising:

a mounting end and a free end, wherein the free end includes an opening for receiving an extending arm therein;

a substrate-mounting surface curved so that every point on the surface is equidistant from the axis, the surface being positioned between the mounting end and the free end; and a disk, located at the mounting end of the drum, the disk having an outer face, and an inner face against which a releasable attachment may be made so as to pull the drum toward the converter's supporting and turning means;

wherein the substrate-mounting surface and the disk are made of the same material.

2. A rotatable drum according to claim 1, wherein the substrate-mounting surface is transparent.

3. A rotatable drum according to claim 1, wherein the disk defines at least one opening passing from the outer face to the inner face.

4. A rotatable drum according to claim 3, wherein the substrate-mounting surface is transparent.

5. A rotatable drum according to claim 3, wherein the substrate-mounting surface and the disk are made from acrylic plastic.

6. A rotatable drum according to claim 5, wherein the substrate-mounting surface is transparent.

7. A rotatable drum according to claim 1, wherein the substrate-mounting surface and the disk are solvent bonded together.

8. A rotatable drum according to claim 1, wherein the substrate-mounting surface and the disk are bonded together with adhesive.

9. A rotatable drum according to claim 1, wherein the substrate-mounting surface and the disk are formed together in a mold so that they form a seamless drum.

10. A rotatable drum for use in an image-information converter having means for supporting and turning the drum about an axis, the drum comprising:

a substrate-mounting surface curved so that every point on the surface is equidistant from the axis; and a disk, located at a first end of the drum, the disk having an outer face, and an inner face against which a releasable attachment may be made so as to pull the drum toward the converter's supporting and turning means;

wherein the substrate-mounting surface and the disk are made of the same material, the material being acrylic plastic.

11. A rotatable drum according to claim 10, wherein the substrate-mounting surface is transparent.

12. A rotatable drum according to claim 10, wherein the disk includes an opening having a plurality of widened areas spaced away from the axis and through which the inner face of the disk is releasably engaged so as to pull the drum toward the converter.

13. A rotatable drum for use in an image-information converter, the drum comprising:

a mounting end and a free end, wherein the mounting end includes a disk, the disk having an inner face and an outer face, the disk defining a plurality of openings passing from the outer face to the inner face, at least one opening having a narrow sector and a wide sector, the openings being spaced away from an axis of the drum and through which the inner face of the disk is releasably engaged so as to pull the drum toward the converter; and a substrate-mounting surface, located between the mounting end and the free end, and curved so that every point on the surface is equidistant from the axis.

14. A rotatable drum according to claim 13, wherein the plurality of openings totals at least three.

15. A rotatable drum according to claim 13, wherein the wide sector of the opening permits a finger of a drum-mounting mechanism to pass through the disk, and the narrow sector of the opening permits the finger to pull the drum toward the converter.

16. A rotatable drum for use in an image-information converter, the drum comprising:

a mounting end and a free end, wherein the mounting end includes a disk, the disk having an outer face and an inner face, against which a releasable attachment may be made so as to pull the drum toward the converter; and a substrate-mounting surface, located between the mounting end and the free end, and curved so that every point on the surface is equidistant from an axis of the drum, wherein the disk and the substrate-mounting surface are made from the same material.

* * * * *